United States Patent

Murari et al.

[11] Patent Number: 5,105,324
[45] Date of Patent: Apr. 14, 1992

[54] DEVICE FOR PROTECTING SEMICONDUCTOR CIRCUITS AGAINST TRANSIENTS ON THE SUPPLY LINE

[75] Inventors: Bruno Murari, Monza; Claudio Diazzi, Milan, both of Italy; Klaus Rischmuller, Aix, France

[73] Assignee: SGS Thomson Microelectronics SRL, Italy

[21] Appl. No.: 518,018

[22] Filed: May 2, 1990

[30] Foreign Application Priority Data

May 12, 1989 [IT] Italy ................ 20487 A/89

[51] Int. Cl.$^5$ .............................. H02H 9/04
[52] U.S. Cl. ........................ 361/18; 361/56; 361/89; 323/223; 323/284
[58] Field of Search ............. 361/91, 111, 56, 54, 361/74, 75, 79, 83, 18, 89; 323/288, 289, 284, 223

[56] References Cited

U.S. PATENT DOCUMENTS

| | | | |
|---|---|---|---|
| 3,903,475 | 9/1975 | Mokrani | 361/56 |
| 4,330,809 | 5/1982 | Stanley | 361/79 |
| 4,589,049 | 5/1986 | Krumrein | 361/56 |
| 4,878,034 | 10/1989 | Gross | 361/75 |

*Primary Examiner*—A. D. Pellinen
*Assistant Examiner*—C. Schultz
*Attorney, Agent, or Firm*—Wolf, Greenfield & Sacks

[57] ABSTRACT

A series of Zener diodes (25) and an electronic power switch, such as an IGBT (18), are connected across a power supply. A circuit including a resistor (20) in series on the electronic switch, a threshold device (36, 38) connected to the resistor and a ramp generator with multiplier (40, 42, 44, 46, FIG. 2) or a thermal sensor (50, 44, 46 FIG. 3) detect the energy level dissipated in the electronic power switch when a transient occurs when the level exceeds a present value, the circuit supplies an output signal to a monostable circuit (26, 28, 48) to drive the electronic power switch with low resistance conditions for a preset time starting from the occurrence of the output signal. Another threshold device, connected to a resistor (30, 32), preferably senses the instantaneous power dissipated in the electronic switch to control the monostable circuit when the instantaneous power is higher than a preset threshold.

23 Claims, 2 Drawing Sheets

DEVICE FOR PROTECTING SEMICONDUCTOR CIRCUITS AGAINST TRANSIENTS ON THE SUPPLY LINE

BACKGROUND OF THE INVENTION

1. Field of the Invention

The present invention relates to a device for protecting electronic semiconductor circuits against transients which occur on the supply line.

2. Prior Art

It is known to protect electronic circuits against transients, such as voltage peaks, which occur on the supply line by means of a Zener diode connected across the power supply to limit the voltage to a value which is not dangerous for the supplied circuits. At the end of the transient, the voltage after the Zener diode automatically returns to its normal value.

This protection, termed of the "ZENER" type, has the advantage of triggering itself automatically, of maintaining the operation of the supplied circuits during the transient, and of automatically restoring the normal supply conditions at the end of the transient. On the other hand, it has the disadvantage that the Zener diode must dissipate an instantaneous power which can be very high, high enough to burn it out, and it furthermore has the disadvantage that the non-zero dynamic impedance of the Zener diode allows the limited voltage to reach, for high values of the current in the Zener diode, levels which can be much higher than the breakdown voltage, with possible damage to the supplied circuits.

Another kind of protection, termed of the "CROWBAR" type, instead discharges the energy of the transient to the ground, short-circuiting the supply voltage. This protection is typically provided by means of an SCR or a TRIAC, triggered either by the voltage itself or by an impulse applied to their control electrode by a control circuit. As is known, once they are triggered, these components do not switch off until the voltage across them inverts or the current which flows through them drops below a limit value. To avoid the flow of an excessive current across the TRIAC or SCR for a long time, this kind of protection usually also interrupts a fuse arranged in series on the supply.

The CROWBAR type of protection therefore offers a high degree of safety even for high or prolonged transients, but it has other disadvantages, in particular difficulty in switching off, interruption of the operation of the supplied circuit even for transients with low energy content, and need to replace the fuse after intervention of the protection.

SUMMARY OF THE INVENTION

The aim of the invention is to provide a device for protecting semiconductor circuits against transients on the supply line which offers the advantages of both kinds of protection, both ZENER and CROWBAR, without the disadvantages, and more particularly which merely limits the supply voltage to within its maximum safety value when the transient is small in duration or intensity and instead short-circuits the supply voltage to the ground in case of transients which are prolonged and/or have a high energy content, automatically returning, in any case, to normal operating conditions when the transient ceases.

The invention achieves this aim and other objects and advantages which will become apparent from the continuation of the description, with a device for protecting semiconductor circuits against transients on their power supply, characterized in that it comprises:

first circuit means which are connected to the terminals of the power supply, are adapted to conduct, keeping a constant voltage between said terminals, when the voltage supplied by the power supply exceeds a preset value, and can be controlled to vary their impedance between a very high value and a very low value;

second circuit means for detecting the level of energy dissipated in said first circuit means and for providing an output signal when said level exceeds a preset value; and third monostable circuit means controlled by said output signal of the first circuit means to control said first circuit means so as to make them assume said very low impedance value for a preset time starting from the occurrence of said output signal of the second circuit means.

According to another advantageous characteristic of the invention, said first circuit means comprise an impedance which comprises at least one Zener diode (25) connected to the terminals of the power supply and an electronic switch (18) which is connected to the terminals of the power supply and can be controlled to vary its resistance between a very high value and a very low value.

According to another advantageous characteristic of the invention, said second circuit means comprise a device for calculating the energy dissipated in the electronic power switch and a first threshold device connected so as to receive the output of said calculating device and to supply said output signal to said third monostable circuit means.

According to yet another advantageous characteristic of the invention, said device for calculating the dissipated energy comprises a resistor which is connected in series to said electronic switch, a first threshold device driven by the node between the switch and the resistor, a ramp generator controlled by said first threshold device, a multiplier connected to the output of said ramp generator, to the node between the switch and the resistor and to the supply voltage.

According to a variated embodiment, said device for calculating dissipated energy comprises a thermal sensor arranged so as to detect the temperature of said electronic switch.

According to another advantageous characteristic of the invention, the protection device furthermore comprises a second threshold device connected to the node between the power switch and the resistor, the output signal whereof is applied in OR mode to said third monostable circuit means.

BRIEF DESCRIPTION OF THE DRAWINGS

The invention is now described in greater detail with reference to a preferred embodiment thereof, illustrated only by way of non-limitative example in the accompanying drawings, wherein.

DETAILED DESCRIPTION OF THE PREFERRED EMBODIMENTS

Figure 1:
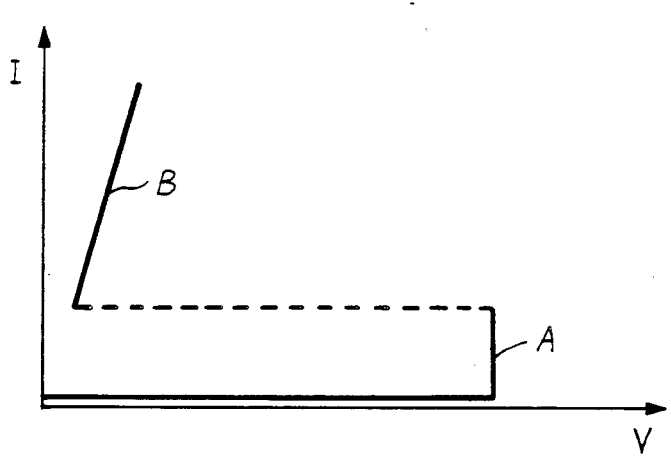
FIG. 1 is a graph which plots the ideal operating characteristic required of a transient protection device according to the invention.

FIG. 1 plots, in graphic form, the law which ideally must link the current I to the voltage V at the terminals of a protection system compliant with the aim of the invention. So long as the current I in the protection component remains low, the portion A of the operating characteristic must be followed, providing a ZENER-type intervention, whereas if the intensity and/or duration of the current in said component exceeds a safety level for the integrity of the protection component, the system must shift to the portion B of the characteristic, short-circuiting the voltage V and providing a CROW-BAR-type action.

Figure 2:
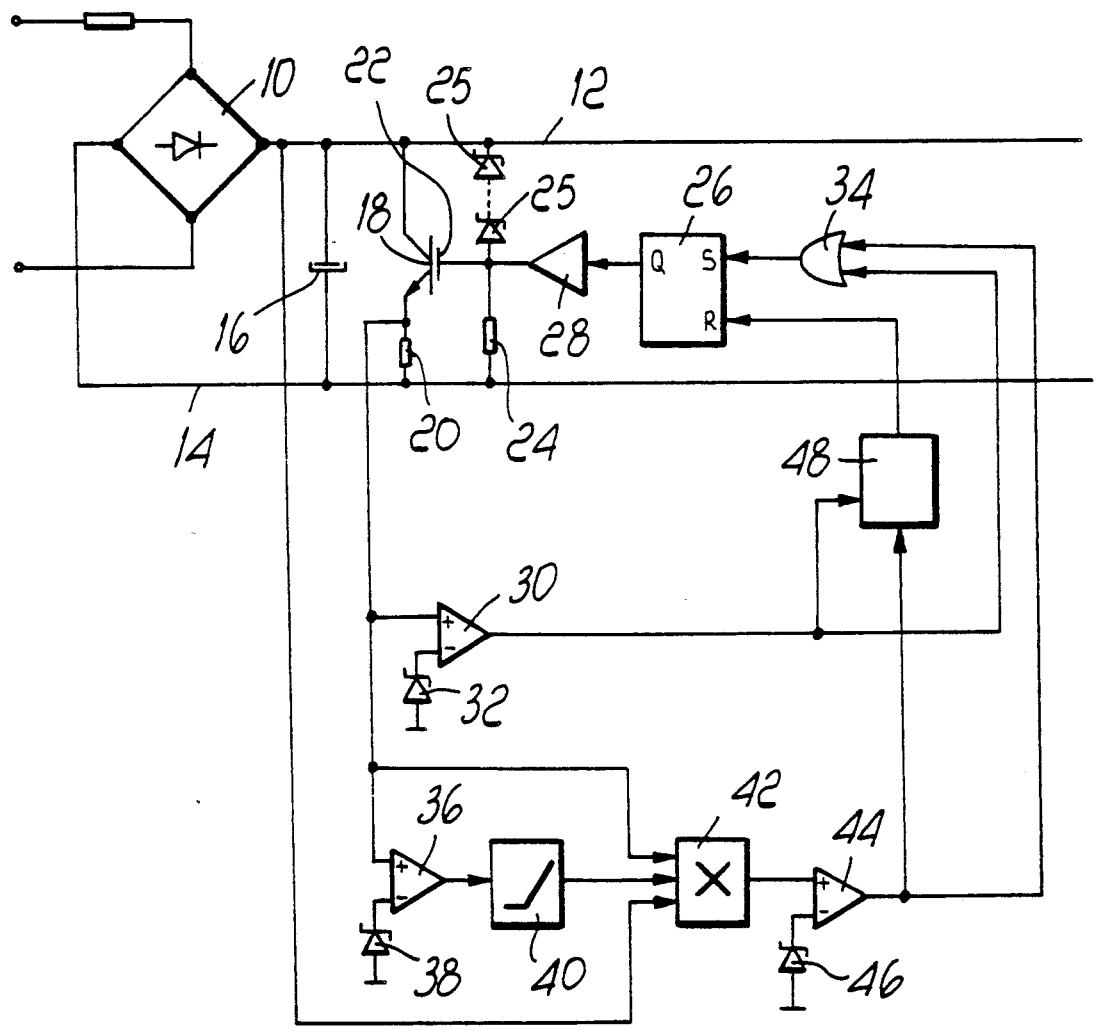
FIG. 2 is a circuit diagram of a first preferred embodiment of the transient protection device according to the invention.

In a first embodiment of the invention, illustrated in FIG. 2, a rectifier bridge 10, supplied by an alternating mains voltage, provides a rectified voltage on two conductors 12, 14 between which an electrolytic capacitor 16 is connected, so as to form a conventional continuous voltage power supply which produces a non-stabilized voltage $V_s$. Also connected across said power lines 12 and 14 is a semiconductor circuit 100 which is to be protected.

An electronic switch, such as an IGBT (Insulated-Gate Bipolar Transistor) 18, is connected between the conductors 12 and 14, whereas a small resistor 20 is inserted in series on the conductor 14. The control electrode (or gate) 22 of the IGBT is connected to the two conductors 12, 14 across a resistor 24 on one side and across the series arrangement of two or more Zener diodes 25 on the other. The gate 22 of the IGBT 18 is controlled by the output Q of a flip-flop 26 by means of a buffer 28.

The resistor 20 develops, at its terminals, a voltage which represents the current level $I_v$ which flows through the IGBT 18. This signal is applied to a first comparator 30, which compares it to a reference value generated by a Zener diode 32. The output of the comparator controls the SET input of the flip-flop 26 across an OR gate 34.

The current level $I_v$ also flows to the input of a second comparator 36 which compares it to a reference value generated by a Zener diode 28 (lower than that of the Zener diode 32). The output of the second comparator 36 is connected so as to start a ramp generator 40, the output voltage whereof is therefore proportional to the time elapsed after the instant in which the IGBT 18 has started to conduct.

Finally, the current level $I_v$ is also applied to one of the inputs of an analog multiplier 42, which also receives, on a second input, the ramp signal generated by the generator 40 as well as the actual rectified supply voltage $V_s$ present between the conductors 12 and 14. The output of the multiplier 42 is therefore proportional to the integral with respect to time of the supply voltage multiplied by the current in the IGBT 18, starting from the instant in which the ramp begins, i.e. from when the current level $I_D$ has become not negligible. The integral therefore represents the total energy $E_D$ absorbed by the IGBT starting from the same instant.

The energy signal $E_D$ is then compared, in a third comparator 44, to a further reference value generated by a Zener diode 46, which represents the maximum energy which it is acceptable to dissipate in the IGBT 18 in its operation as Zener diode. Once this threshold is exceeded, the comparator 44 emits a signal which controls the SET input of the flip-flop 26 across the OR gate 34.

The output signals of the comparators 30 and 44 are also applied to a timer 48 which is set to count a preset time interval which corresponds to the maximum time for which it is acceptable for the IGBT 18 to keep conducting. The output of the timer 48 is connected to the RESET input of the flip-flop 26.

As is known, the IGBT is easy to drive ON and OFF by means of the gate, since it is equivalent, from this point of view, to a MOS component, and has a high current flow capacity, comparable to that of a bipolar transistor. The behavior of the above described circuit, illustrated in FIG. 2, is therefore as follows.

When a transient occurs in the voltage $V_s$, the Zener diodes 25 switch on the IGBT 18, limiting its gate-drain voltage to the value which is the sum of the voltages of the Zener diodes 25. The IGBT 18 behaves, in this step, like a Zener power diode, with very low dynamic impedance. If the duration and/or energy content of the transient remain low, the energy dissipated in the IGBT does not reach dangerous values, and the current level signal $I^D$ exceeds neither the threshold of the Zener diode 32 nor that of the Zener diode 38. When the transient ceases, the IGBT resumes being off, and the entire system returns to its normal operating conditions.

If instead the signal $I_D$ which is generated at the terminals of the resistor 20 exceeds the threshold of the Zener diode 32, the flip-flop 26 is set. If the signal $I_D$, despite being insufficient to switch the comparator 30, nonetheless exceeds the (lower) threshold of the Zener diode 32, the calculation of the total energy dissipated in the IGBT is started, and when said energy exceeds the threshold set by the Zener diode 46 the flip-flop 26 is set again. In both cases, which for different reasons both correspond to a dissipated energy dangerous for the IGBT 18, said IGBT is driven to a low-resistance conduction state such as to short-circuit the supply to the ground.

The output signals of the comparators 30 and 44, which both separately set the flip-flop 26, also start the timer 48, which after a preset time resets the flip-flop 26 in any case, removing the drive signal from the gate of the IGBT. If the transient has not ended in the meantime, the Zener diodes 25 momentarily intervene again to switch the IGBT 18 on again; after this, the above described cycle is repeated if necessary.

In order to ensure that the control circuit can operate even during the CROWBAR action of the IGBT, its power supply is provided, in a manner which is obvious to the expert in the field, by a separate electrolytic capacitor, taking into account the extremely short times for which the protection must intervene.

Figure 3:
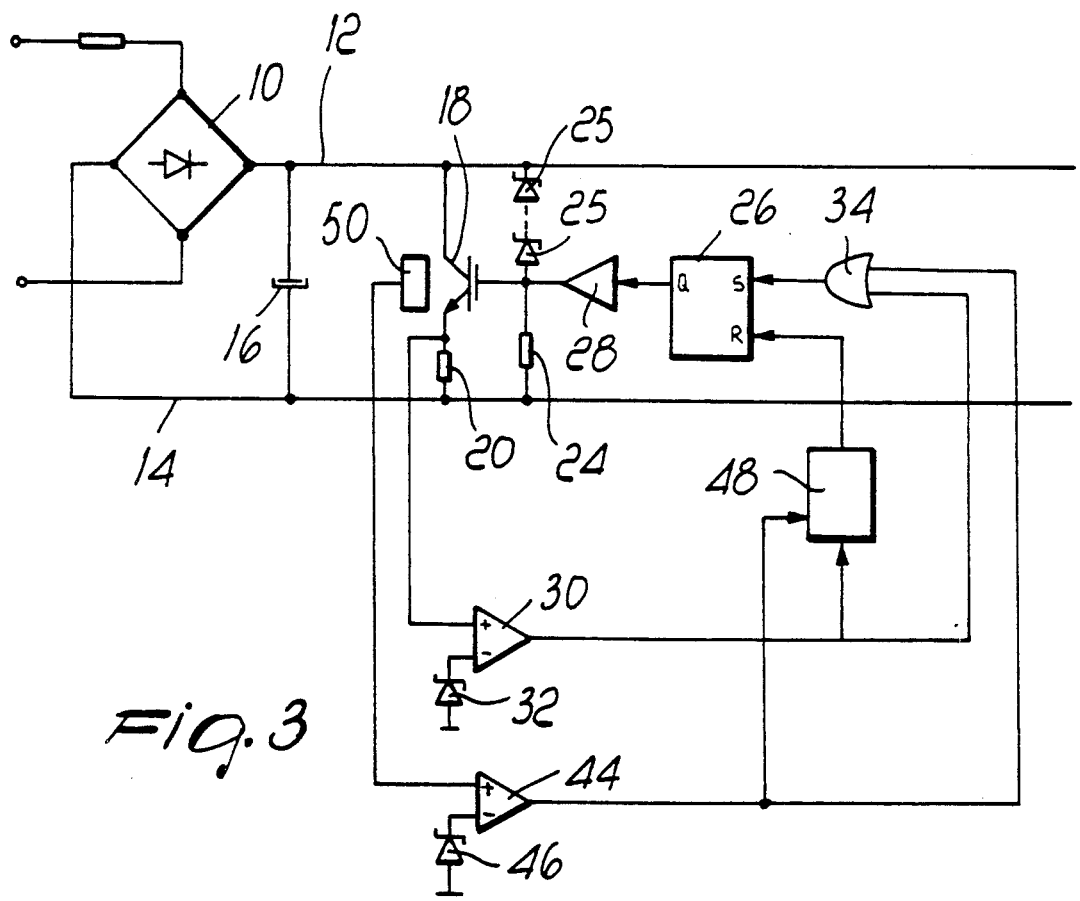
FIG. 3 is a circuit diagram of a second embodiment of the device according to the invention.

FIG. 3, in which the components equivalent to FIG. 2 are indicated by the same reference numerals, illustrates a second embodiment of the invention. Said embodiment is largely identical to that of FIG. 2, and differentiates itself therefrom in the lack of the circuit for calculating the energy signal $E_D$ and in its replacement with a thermal sensor 50 arranged so as to measure the temperature of the IGBT 18 and provide a signal to the comparator 44. It can be seen that this arrangement is equivalent or comparable, in its practical effects, to the calculation of the energy, and leads to similar consequences for the behavior of the circuit.

Other modifications could be performed to the two described preferred embodiments. For example, the IGBT 18 could be replaced with another kind of electronic power switch, such as a MOS transistor or a bipolar power transistor or another equivalent circuital element, or the function of the timer 48 might be provided by replacing the flip-flop and the timer with a monostable means or in yet another manner. The ramp generator and the multiplier might also be replaced with different means adapted to provide a measurement, even a greatly approximate one, of the energy dissipation level of the IGBT. Finally, some functions, such as the comparator 30 with Zener diode 32, might be eliminated while preserving the usefulness of the device as a whole.

All the above modifications and variations, as well as others, are to be considered as comprised within the scope of the inventive concept.

We claim:

1. Device for protecting semiconductor circuits against transients on their power supply, characterized in that it comprises:
   first circuit means which are connected to the terminals of the power supply, are adapted to conduct, keeping a constant voltage between said terminals when the voltage supplied by the power supply exceeds a preset value, and can be controlled to vary their impedance between a very high value and a very low value;
   second circuit means for detecting the level of energy dissipated in said first circuit means and for providing an output signal when said level exceeds a preset value; and
   mono-stable circuit means controlled by said output signal of said second circuit means to control said first circuit means so as to make said first circuit means assume said very low impedance value for a preset time starting from the occurrence of said output signal of said second circuit means.

2. Protection device according to claim 1, characterized in that said first circuit means comprise an impedance which comprises at least one zener diode connected to the terminals of the power supply; and an electronic switch having a control electrode, which is connected to the terminals of the power supply and can be controlled to vary its own resistance between a very high value and a very low value.

3. Protection device according to claim 2, characterized in that said impedance comprises at least one Zener diode arranged in series to a resistor.

4. Protection device according to claim 3, characterized in that the node between said at least one Zener diode and said resistor is connected to the control electrode of said electronic power switch.

5. Protection device according to claim 4, characterized in that said second circuit means comprise a device for calculating the energy dissipated in the electronic switch and a first threshold device connected so as to receive the output of said calculating device and to supply said output signal to said mono-stable circuit means.

6. Protection device according to claim 5, characterized in that said device for calculating dissipated energy comprises a resistor connected in series to said electronic switch, an additional threshold device driven by the node between said electronic switch and said resistor, a ramp generator controlled by said additional threshold device, a multiplier connected to the output of said ramp generator, to said node, and to the supply voltage.

7. Protection device according to claim 5, characterized in that said device for calculating the energy dissipated arranged so as to detect the temperature of said electronic switch.

8. Protection device according to claim 6, characterized in that it furthermore comprises a second threshold device connected to the node between the electronic switch and the resistor, the output signal whereof is applied to said second circuit means.

9. Protection device according to claim 1, characterized in that said mono-stable circuit means comprise a bistable circuit with a set input and a reset input, and a timer which has an output connected to the reset input of the bistable circuit, and in that the output signal of said second circuit means is applied to the control input of the timer and to the set input of the bistable circuit.

10. Protection device according to claim 2, characterized in that said electronic switch is an IGBT.

11. Device for protecting semiconductor circuits against transients on their power supply comprising:
   first circuit means connected to the terminals of the power supply, said first circuit means being adapted to conduct so as to keep a constant voltage between said terminals when the voltage supplied by the power supply exceeds a preset value, said first circuit means being furthermore controllable to vary their impedance between a very high value and a very low value;
   second circuit means for detecting the level of energy dissipated in said first circuit means and for providing a first output signal when said level of energy exceeds a preset value; and
   mono-stable circuit means controlled by said first output signal so as to make said first circuit means assume said very low impedance value for a preset time starting from the occurrence of said first output signal.

12. Protection device according to claim 11, wherein said first circuit means include an impedance which comprises at least one zener diode connected to the terminals of the power supply and an electronic switch which is connected to the terminals of the power supply and can be controlled to vary its own resistance between a very high value and a very low value.

13. Protection device according to claim 12, wherein said impedance comprises at least one zener diode arranged in series to a resistor.

14. Protection device according to claim 13, wherein a node defined between said at least one zener diode and said resistor is connected to a control electrode of said electronic power switch.

15. Protection circuit according to claim 12, wherein said second circuit means comprise a device for calculating the energy dissipated in the electronic switch; and a first threshold device connected so as to receive the output of said calculating device and to supply said first output signal to said mono-stable circuit means.

16. Protection device according to claim 15, wherein said device for calculating dissipated energy comprises:
   a resistor connected in series to said electronic switch;
   a second threshold device driven by a node defined between said electronic switch and said resistor;
   a ramp generator controlled by said second threshold device; and
   a multiplier connected to the output of said ramp generator, to said node, and to the supply voltage.

17. Protection device according to claim 15, wherein said device for calculating dissipated energy comprises a thermal sensor arranged so as to detect the temperature of said electronic switch.

18. Protection device according to claim 16, further comprising a third threshold device connected to said node defined between said electronic switch and said resistor, the output signal thereof being applied to said mono-stable circuit.

19. Protection device according to claim 11, wherein said mono-stable circuit means comprise a bistable circuit with a set input and a reset input, and a timer which has an output connected to the reset input of the bistable circuit, said first and second output signals being applied to the control input of the timer and to the set input of the bistable circuit.

20. Protection device according to claim 12, wherein said electronic switch is an IGBT.

21. Protection device according to claim 11, comprising third circuit means for detecting the level of current across said first circuit means and for providing a second output signal when said level of current exceeds a preset value, wherein said mono-stable circuit means are controlled by said second output signal so as to make said first circuit means assume said very low impedance value for a preset time starting from the occurrence of said second output signal.

22. Device for protecting semiconductor circuits against transients on their power supply comprising:
first circuit means connected to the terminals of the power supply, said first circuit means being adapted to conduct so as to keep a constant voltage between said terminals when the voltage supplied by the power supply exceeds a preset value, said first circuit means being furthermore controllable to vary their impedance between a very high value and a very low value;
second circuit means for detecting the level of energy dissipated in said first circuit means and for providing a first output signal when said level of energy exceeds a preset value;
third circuit means for detecting the level of current across said first circuit means and for providing a second output signal when said level of current exceeds a preset value; and
mono-stable circuit means controlled by said first and said second output signals so as to make said first circuit means assume said very low impedance value for a preset time starting from the occurrence of said first output signal or said second output signal.

23. Device for protecting semiconductor circuits against transients on the power supply, characterized in that it comprises:
first circuit means which are connected to the terminals of the power supply, are adapted to conduct, keeping a constant voltage between said terminals when the voltage supplied by the power supply exceeds a preset value, and can be controlled to vary the impedance between a very high value and a very low value, said first circuit means including an electronic switch which is connected to the terminals of the power supply and could be controlled to vary its own resistance between a very high value and a very low value;
second circuit means for detecting the level of energy dissipated in said first circuit means and for providing an output signal when said level exceeds a preset value, said second circuit means comprising:
a device for calculating the energy dissipated in the electronic switch, comprising:
a resistor connected in series to the electronic switch;
a threshold device driven by the node between the electronic switch and the resistor;
a ramp generator controlled by said threshold device; and
a multiplier connected to the output of said ramp generator, to said node, and to the supply voltage;
an additional threshold device connected so as to receive the output of the calculating device and to supply the output signal to a mono-stable circuit means;
the mono-stable circuit means being controlled by the output signal of said second circuit means to control said first circuit means so as to make said first circuit means assume said very low impedance value for a preset time starting from the current to said output signal of said second circuit means.

* * * * *